Dec. 15, 1959 W. H. STEVENS 2,916,767

FILM CASTING APPARATUS INCLUDING MEANS TO RESTRAIN TRANSVERSE SHRINKAGE OF THE FILM

Filed Dec. 7, 1956 2 Sheets-Sheet 1

INVENTOR

WILLIAM HENRY STEVENS

BY [signature]

ATTORNEY

Dec. 15, 1959 W. H. STEVENS 2,916,767
FILM CASTING APPARATUS INCLUDING MEANS TO RESTRAIN TRANSVERSE SHRINKAGE OF THE FILM
Filed Dec. 7, 1956 2 Sheets-Sheet 2
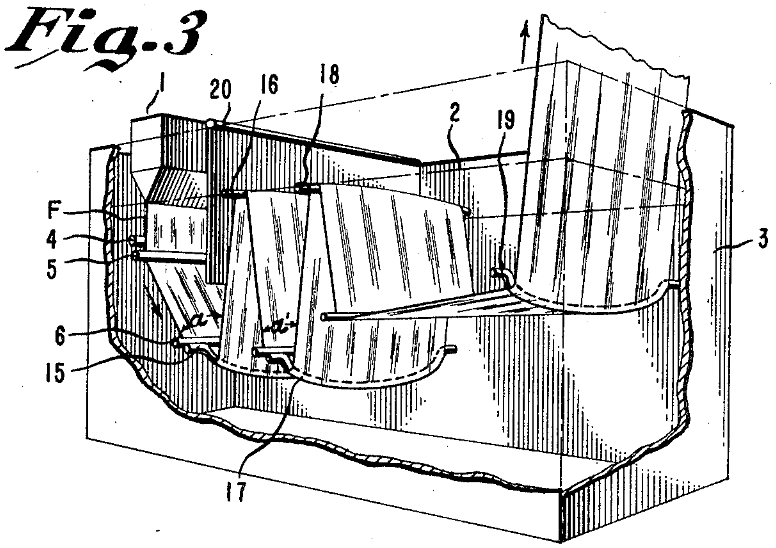
Fig. 3
Fig. 4
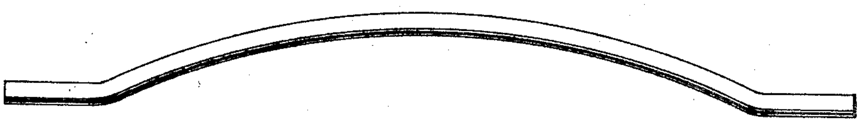
Fig. 5
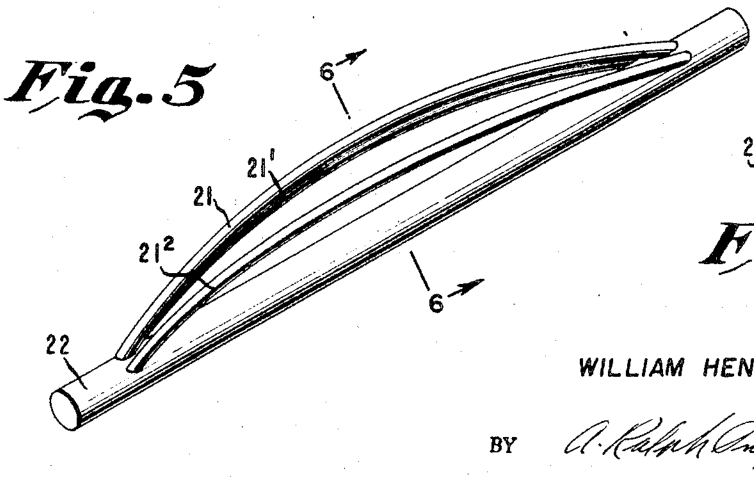
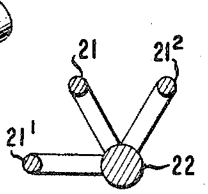
Fig. 6
INVENTOR
WILLIAM HENRY STEVENS
BY A. Ralph Snyder
ATTORNEY 2,916,767
Patented Dec. 15, 1959

2,916,767

FILM CASTING APPARATUS INCLUDING MEANS TO RESTRAIN TRANSVERSE SHRINKAGE OF THE FILM

William Henry Stevens, Nashville, Tenn., assignor to E. I. du Pont de Nemours and Company, Wilmington, Del., a corporation of Delaware Application December 7, 1956, Serial No. 626,992

3 Claims. (Cl. 18—15)

This invention relates to film casting apparatus, and, more particularly, to improvements in film casting apparatus employed in the manufacture of regenerated cellulose film.

In the manufacture of regenerated cellulose film on a so-called "casting machine," as described by Brandenberger in U.S.P. 1,548,864, the gel film, after coagulation and regeneration, is led through the numerous purification and wash tanks and finally into a tank which normally contains a softener and other materials which impart certain properties to the final dried film. After passage through this last tank, the film passes over the numerous rotating heated drier rolls and then, after the water content is reduced to the proper level, the film is wound up in large mill rolls.

By the previously disclosed process, the production of regenerated cellulose film always resulted in a final product which was little more than one-half as wide as the originally cast film. The film is restrained from natural shrinking in its longitudinal direction since the peripheral speed of the rollers which continuously pull the film through the machine is substantially constant and the slippage of the film in the machine direction is substantially negligible. On the other hand, there is substantially no restraint on the film in the direction transverse to the machine direction and the resultant free shrinkage of the film in its transverse direction is reflected in the substantial width reduction noted above.

As the casting machine speed is increased, the film width which can be attained becomes progressively less, the frequency of web breaks which occur prior to the cellophane drier increases, and the tendency toward uneven shrinkage characteristics also increases. The further reduction in film width which accompanies increases in casting machine speeds is attributed to increased tensioning of the gel film in the machine direction without a corresponding increase in transverse directional tensioning. The plastic gel "necks in" and becomes narrower under the increased machine direction tension until such time as it is coagulated, regenerated and collapsed.

The current increase in casting speed, created by the production demands in the industry, causes unacceptable losses in cast film width. One method for regaining the loss in film width is to replace existing extrusion hoppers with ones having greater length of extrusion slot and to widen the first several tanks of the casting machine. This, however, is a costly procedure. Also, from a practial standpoint, the size of the equipment places limits on the width of the film possible of production.

Also, it is known to impose transverse stretching forces on the freshly extruded web by the use of curved guide rods in the coagulating and/or regenerating bath, as shown in Hutchinson and Eckstein U.S.P. 2,311,755, for the purpose of improving the physical characteristics of the film in the transverse direction and, hence, rendering the film more homogeneous as respects its physical characteristics. However, at present day casting speeds, the arrangement of guide rods, disclosed in the aforementioned patent, is wholly ineffective to substantially reduce the width loss incident to increased casting machine speeds. We have determined that this failure is due to the fact that the arrangements of the curved rods taught by the patent do not permit those changes in direction of web travel at the curved rods necessary to secure maximum contact or "wrap around" of the web as it passes over the rods, which, in turn, is necessary in order to achieve the high degree of tentering action required to effect a satisfactory improvement in width loss. By "maximum wrap around," it is meant that the plane of the film is essentially that of the curved rod on approaching the rod, said rod being convex toward the film and pressed thereagainst during the guiding operation, and makes an angle of not greater than 90° with the plane of the film when moving away from the rod.

An object of this invention, therefore, is to provide improvements in film casting apparatus. Another object is to provide improved means for inhibiting the transverse shrinkage of non-fibrous cellulosic webs. Still another object is to provide means for imposing transverse tension on a continuous cellulosic web during the coagulation and/or regeneration of a web formed from viscose. A still further object is to provide means for reducing the width loss of regenerated cellulose continuous film cast at high speed. These and other objects will more clearly appear hereinafter.

The foregoing objects are realized by the present invention which, briefly stated, comprises in combination, a coagulating bath effective to coagulate film-forming material, means for extruding a continuous web of coagulable film-forming material, e.g., viscose, in to the coagulating bath, a plurality of transversely disposed stationary guide members in said bath including a plurality of curved guide members, arranged to guide the web progressively through the bath in an alternately ascending and descending path, there being at least two descents whereby the web forms at least one upwardly extending pocket in its travel through the bath, said curved guide members being convex against the web, the guide members being further arranged so that with respect to at least two of said curved guide members the plane of the web immediately approaching the member makes an angle of not greater than 90° with the plane of the web leaving the member.

In the conventional procedures for manufacture of film from cellulose xanthate solutions, i.e., viscose, the viscose is extruded through suitable hopper lips in film form directly into the coagulating and/or regenerating bath. Sometimes, it is found desirable to extrude the viscose into air, but when this is done, there is only an extremely brief travel through air (less than 1") after which the film immediately enters the bath which brings about coagulation. Coagulation of the viscose upon the surface of the extruded sheet commences immediately upon contact of the bath. The coagulation phenomenon rapidly extends through the thickness of the sheet so there is produced almost immediately a film or web which is self-supporting.

The regeneration of the cellulose from its xanthate compound proceeds simultaneously with coagulation when the bath contains acid and salt, but at a much lower rate so that the sheet or web has traveled a considerable distance through the bath before regeneration is complete. During this time there is sufficient strength to support the web and prevent rupture thereof.

In the early stages the web has not acquired a high degree of elasticity and is susceptible to plastic distortion. It is in these early stages of great plasticity that the transverse stretching operation of this invention is preferably carried out. It is desirable that a web traveling through the coagulating and/or regenerating bath immediately after extrusion acquires sufficient superficial coagulation to give it the necessary support and sufficient hardness of surface to resist marring when in contact with solid surfaces such as the novel apparatus disclosed herein, before coming into contact with any solid guiding member.

The following description of preferred embodiments typical of this invention is to be read in connection with the accompanying drawings wherein:

Fig. 3 is a diagrammatic side elevation showing still another arrangement of guide members in the bath;

Fig. 4 is a side view of a curved guide member;

Fig. 5 is a perspective view of a modified form of guide member; and

Fig. 6 is a cross-sectional view in the line 6—6 of Fig. 5.

Figure 1:
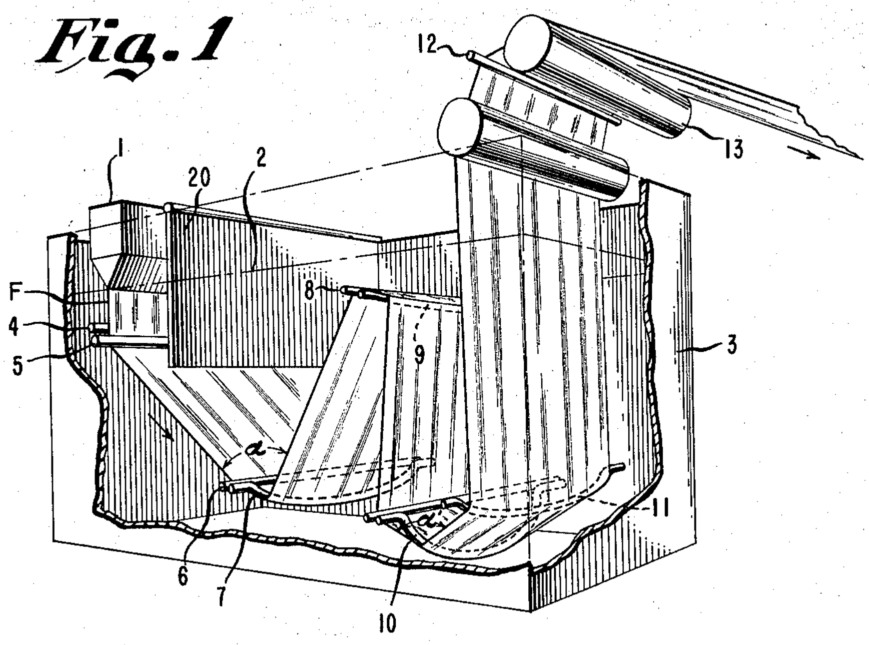
Fig. 1 is a diagrammatic side view of the first tank of a casting machine showing guide members arranged in accordance with the principles of my invention.

Referring to Fig. 1, an extruder 1 of conventional design, is positioned to extrude a continuous web F of film-forming material, e.g., viscose, below the liquid level of the coagulating bath 2 contained in tank 3 provided with a suitable inlet and outlet means (not shown). The freshly extruded web first passes downwardly over conventional straight guide members 4, 5 and 6 and, thence, around curved guide member 7 so positioned that the convex side of the curved portion of the rod contacts the film. The web then passes upwardly and over the straight member 8 and the convex portion of a second curved guide member 9 positioned just below the surface of the bath, and downwardly and under a third curved guide member 10, the web passing between guides 7, 9 and 10 forming an upwardly extending pocket terminating just below the surface of the bath. From guide member 10 the web passes over and in contact with the convex side of the curved member 11, and out of the bath to the conventional wiper rod 12 (to remove excess bath) and the transfer roll 13. The guide members are so disposed, each with respect to its neighbor, that the plane of the web approaching guide 7 makes an angle $\alpha$ of not greater than 90° with the plane of the web leaving guide 7, and the plane of the web approaching guide 10 makes an angle $\alpha'$ of not greater than 90° with the plane of the web leaving guide 10 whereby maximum wrap around is obtained at curved guides 7 and 10. It is obvious that in order to achieve a maximum wrap around at least two of the curved guide members whereby to effect a satisfactory lessening in the width reduction of the web, it is requisite that the path of the web have at least two descents and, hence, form at least one upwardly projecting pocket; i.e., the upwardly projecting pocket is necessary to permit those continuously progressive changes in the direction of the web travel at the curved guides which are necessary for the most effective transverse tentering by the curved guides. The top of each pocket is preferably located at or near the bath surface in order to allow any accumulations of gas to vent easily to the atmosphere. Unexpectedly, I have found that there is no tendency for the accumulation of gas in the pockets except during slow downs. At such times, one end of the guide member may be raised or lowered slightly by any convenient means (not shown). The sloping web then automatically bleeds gas out at the higher side. When the speed is increased, the guide member is shifted to its regular level position.

Figure 2:
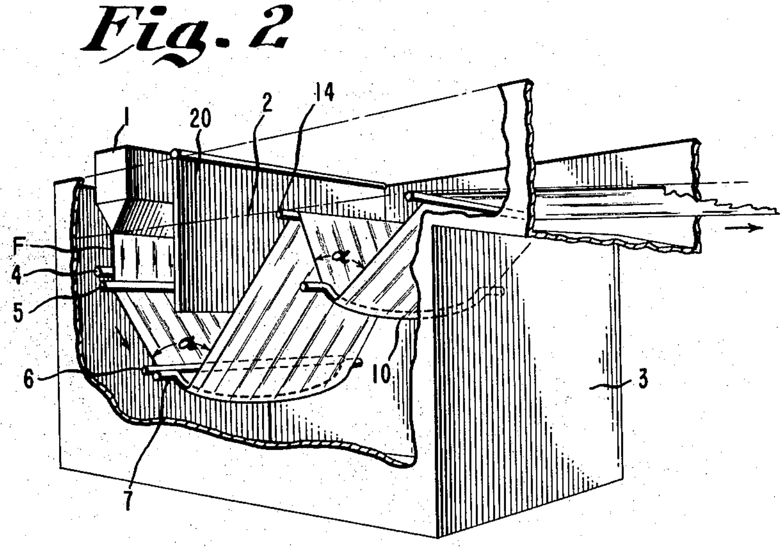
Fig. 2 is a diagrammatic side elevation showing another arrangement of web guide members in a coagulating and/or regenerating bath of a casting machine.

In the arrangement shown in Fig. 2 a straight guide 14 has been substituted for guides 8 and 9 of Fig. 1, and in Fig. 3 a combination of curved guide members 15, 16, 17, 18 and 19 are employed, the bottom guides 15 and 17 having a greater radius of curvature than guides 16, 18 and 19. Each arrangement, however, is characterized by at least two descents in the web path, and angles $\alpha$ and $\alpha'$ are not greater than 90°.

It is desirable to control bath currents produced by the higher bath flow required to effect the same degree of coagulation and by the greater turbulence created by the additional agitation of the bath by the film web at the increased casting speeds. Such control can be satisfactorily achieved by the use of a baffle (i.e., barrier to bath flow) 20 (Fig. 1) extending across the regenerating and/or coagulating bath tank and as far below bath level as possible without interfering with the film. Location and size of the baffle should be such as to create the greatest volume of quiet bath in the longest practical travel path near the extrusion hopper lips in the quiet bath and located between the point of extrusion and the first vent guide. A baffle which makes an angle of 90° with the bath surface is superior to a baffle which slants back toward the film web below the hopper with an angle less then 90° between the baffle and the bath surface. When in optimum position, such a baffle serves to create the most effective quieting action on the largest volume of bath near the lips where the extruded gel is extremely tender and can be caused to wrinkle and to vary in thickness by any slight bath turbulence.

As shown in Fig. 4, the curved members are preferably in the form of rods of generally circular cross-section bowed in the center to form an arc of suitable radius and terminating at each end in a straight section or trunnion. Preferably, the trunnion length is held to a minimum in order to obtain maximum length of the bowed portion thus avoiding film contact at the transition from the bowed to the straight sections of the rod which tends to cause edge wrinkles in the film. A bundle, i.e., a plurality of curved rods, constructed as shown in Fig. 5 by welding or otherwise attaching two or more curved rods, e.g., 21, 21', and 21² to a reinforcing straight rod 22, may also be used at any or all of the various positions in place of a single curved rod and still obtain the greatest tentering effect and maximum width, providing the bundle of curved rods is arranged to yield the requisite maximum wrap around; that is, the plane of the film approaching the first of the bundle of curved rods makes an angle of not greater than 90° with the plane of the film moving away from the last of the bundle of curved rods.

The curved guide member may be constructed of a rod or tube bent into the desired shape or contour. It may also be suitably fashioned from a slab or relatively thick sheet of material so as to have a rounded edge of the desired curvature or contour. The curved guide member need not be rigid, but may be constructed of flexible material with suitable arrangements for adjusting and maintaining it in the desired contour or curvature. The contour may be of constant radius of curvature, or it may be of varying radii of curvature to secure special effects. The radius of curvature will preferably be such that the center of the web will be distended from 3 to 7 inches from the line joining the edges of the web where they contact the curved guide member. The ends or trunnions of the curved members may be mounted on bearing surfaces so that the effective curvature with relation to the travel of the web may be varied at will.

It is not necessary to restrict the use of the curved guide members exclusively to the early stages of regenerated cellulose web coagulation and/or regeneration where its plasticity is greatest. In the latter stages when the plasticity is reduced, it still responds to the transverse stretching of the curved guides.

It should be also clearly understood that machine roll or rolls, positively driven or idling, may be introduced into the sequence of multiple curved rods at any point. As casting speeds are increased, it becomes desirable to obtain tentering action beyond the first point at which a driven roll contacts the film. Also, any or all of the vent rods at or near bath surface could be driven or idling rolls.

The curved guides and the baffle may be of any material which is suitable for installation in the coagulating and/or regenerating bath. Among the suitable materials are nickel, stainless steel, glass, and the like. Guides of less resistant materials, with rubber coatings, are also satisfactory.

The following examples further illustrate the principles and practice of this invention.

*Example 1*

Viscose containing 8.5% by weight of cellulose and 6.5% caustic soda was extruded through an orifice as is customary in the manufacture of regenerated cellulose sheeting to form a web having an initial or as-cast width of 86 inches. The hopper lips were beneath the surface of the aqueous coagulating and/or regenerating bath, which comprised 12.5% sulfuric acid and 18.75% sodium sulfate. After a travel of 20" through the bath the web passed over the first curved guide rod. The web then passed upward almost vertically and then over a straight guide rod and a curved guide rod located slightly below bath level. From the second curved rod the web passed almost vertically downward, then under two curved rods in succession and finally upward to emerge from the bath. All curved and straight guide rods were of circular cross section and either of glass or a corrosion resistant metal alloy. The rods were positioned as shown in Fig. 1. The first and third curved rods distended the center of the web 6.9" more than the marginal edges. The second and the fourth curved rods distended the center of the web 4.1" more than the web margins. The curved rods were circular arcs, the first and third curved rods with 12' radius and the second and fourth curved rods with a 20' radius of curvature.

The dried film width obtained was 8% wider than film formed under the same conditions except that straight guides were employed in place of curved guides.

*Example 2*

Viscose similar to that of Example 1 was extruded through a suitable orifice into a similar bath. With the arrangement of the curved and eccentric rods as shown in Fig. 2, an increase in finished width of about 9% was obtained, the first curved rod distended the center of the web 5.1" more than the edges, and the second distended the center of the web 4.1" more than the edge lanes, or web margins.

The apparatus hereinbefore described enables the production of sheets or films of regenerated cellulose substantially free from surface imperfections, such as streaks, striations and other irregularities; consequently, the film possesses better sheet flatness and better appearance. In addition to the previously mentioned advantages, the apparatus tends to improve the uniformity of the transverse strength of the film by aiding and permitting the shrinkage of the cellulose, in the course of the formation of the film or in a subsequent treatment, to be more uniformly distributed between the longitudinal direction and the transverse direction, as well as more uniformly distributed in the transverse direction. Also, the use of the apparatus of this invention is characterized by its uniformity of operation, simplicity and high degree of efficiency.

The multiple dip principle of this invention (i.e., providing an alternately ascending and descending path having at least two descents) permits increased travel in the coagulating and/or regenerating tank and tends toward reduced frequency of wet end breaks, and a general improvement in the physical properties of the film or web. Also, lower extrusion pressures can be used satisfactorily as a result of the web tensions which are distributed differently when multiple dips and several curved rods are used. These lower extrusion pressures are reflected in desirable wider lip opening.

I claim:

1. Film casting apparatus comprising in combination, a coagulating bath, means for extruding into said bath a continuous web of film-forming material coagulable in said bath, a plurality of transversely disposed stationary guide members in said bath including a plurality of curved guide members arranged to guide the web progressively through the bath in an alternately ascending and descending path there being at least two descents, said curved guide members being convex against the web, the guide members being arranged so that with respect to at least two of said curved guide members the plane of the web immediately approaching the curved guide member makes an angle of not greater than 90° with the plane of the web leaving the curved guide member.

2. Apparatus for casting regenerated cellulose film comprising in combination, a coagulating bath means for extruding into said bath a continuous web of cellulosic material coagulable in said bath, a plurality of transversely disposed stationary guide members in said bath including a plurality of curved guide members arranged to guide the web progressively through the bath in an alternately ascending and descending path there being at least two descents, said curved guide members being convex against the web, the guide members being arranged so that with respect to at least two of said curved guide members the plane of the web immediately approaching the curved guide member makes an angle of not greater than 90° with the plane of the web leaving the curved guide member.

3. The apparatus of claim 2 wherein the radius of curvature of at least two of said curved guide members is such that the center of the web will be distended from 3 to 7 inches from the line joining the edges of the web where they contact the curved guide member.

References Cited in the file of this patent

UNITED STATES PATENTS

| | | |
|---|---|---|
| 1,590,999 | Czapek et al. | June 29, 1926 |
| 2,311,755 | Hutchinson et al. | Feb. 23, 1943 |

FOREIGN PATENTS

| | | |
|---|---|---|
| 423,365 | Great Britain | Jan. 29, 1935 |